(12) United States Patent
Leymann et al.

(10) Patent No.: US 8,719,215 B2
(45) Date of Patent: May 6, 2014

(54) CONTROLLING THE CREATION OF PROCESS INSTANCES IN WORKFLOW MANAGEMENT SYSTEMS

(75) Inventors: Frank Leymann, Aidlingen 3 (DE); Dieter Roller, Schonaich (DE)

(73) Assignee: International Business Machines Corporation, Armonk, NY (US)

( * ) Notice: Subject to any disclaimer, the term of this patent is extended or adjusted under 35 U.S.C. 154(b) by 2798 days.

(21) Appl. No.: 10/468,636

(22) PCT Filed: Jan. 24, 2002

(86) PCT No.: PCT/EP02/00710
§ 371 (c)(1),
(2), (4) Date: Dec. 22, 2003

(87) PCT Pub. No.: WO02/073479
PCT Pub. Date: Sep. 19, 2002

(65) Prior Publication Data
US 2006/0112062 A1    May 25, 2006

(30) Foreign Application Priority Data

Feb. 22, 2001   (EP) .................................... 01104202

(51) Int. Cl.
*G06F 17/00* (2006.01)
*G06F 7/00* (2006.01)

(52) U.S. Cl.
USPC .......................................... 707/608; 705/301

(58) Field of Classification Search
USPC .................. 707/8, 102; 705/7, 8, 9; 709/204; 718/101, 104; 711/170
See application file for complete search history.

(56) References Cited

U.S. PATENT DOCUMENTS

| 3,875,391 | A | | 4/1975 | Shapiro et al. |
| 4,025,771 | A | | 5/1977 | Lynch, Jr. et al. |
| 4,658,355 | A | | 4/1987 | Hatakeyama et al. |
| 5,581,758 | A | * | 12/1996 | Burnett et al. ............ 707/103 R |
| 5,890,133 | A | | 3/1999 | Ernst |

(Continued)

OTHER PUBLICATIONS

P. Narasimhan et al., The Interception Approach to Reliable Distributed CORBA Objects, USENIX Conference on Object-Oriented Technologies and Systems [online] Jun. 1997, pp. 1-5, XP002213290 Portland, OR, Retrieved from the Internet: URL: http://www.usenix.org/publications/library/proceedings/coots97/full_papers/panel.narasimhan/narasimhan.pdf (retrieved Sep. 12, 2002).

(Continued)

*Primary Examiner* — Angelica Ruiz
(74) *Attorney, Agent, or Firm* — Terrile, Cannatti, Chambers & Holland, LLP; Robert W. Holland

(57) ABSTRACT

The present invention relates to a technique for controlling the creation of process instances within an execution environment such as a Workflow Management System. Upon receiving a request to create a process instance and corresponding input data to be processed by the process instance, a process instance identifier is first constructed for the process instance to be created based on the provided input. Next, the create request is executed, but only if no process instance exists or existed with the same process instance identifier. In the case where a process instance already exists or existed with the same process instance identifier, the present invention permits a user-defined action to be carried out to avoid an identifier conflict.

14 Claims, 3 Drawing Sheets

(56) References Cited

U.S. PATENT DOCUMENTS

| | | | |
|---|---|---|---|
| 5,892,905 A | 4/1999 | Brandt et al. | |
| 5,960,420 A * | 9/1999 | Leymann et al. | 707/1 |
| 6,438,560 B1 * | 8/2002 | Loen | 707/103 R |
| 6,643,652 B2 * | 11/2003 | Helgeson et al. | 1/1 |
| 2001/0027439 A1 * | 10/2001 | Holtzman et al. | 705/39 |
| 2002/0023109 A1 * | 2/2002 | Lederer et al. | 707/511 |

OTHER PUBLICATIONS

European Office Action for Application No. 02711813.2-2201, dated Dec. 14, 2007.

* cited by examiner

CONTROLLING THE CREATION OF PROCESS INSTANCES IN WORKFLOW MANAGEMENT SYSTEMS

BACKGROUND OF THE INVENTION

1. Field of the Invention

The present invention relates to a technique for improving the robustness and ease-of-use of Workflow Management Systems (WFMS) or a computer system with comparable functionality related to the creation of process instances from process models.

2. Description of the Related Art

A new area of technology with increasing importance is the domain of Workflow Management Systems (WFMS). WFMS support the modeling and execution of business processes. Business processes executed within a Workflow Management System environment control who will perform which piece of work from a network of pieces of work and which resources are exploited for this work. The individual pieces of work might be distributed across a multitude of different computer systems connected by some type of network.

The product "IBM MQSeries Workflow" (previously called IBM FlowMark) from International Business Machines Corp. (IBM) represents such a typical modern, sophisticated, and powerful workflow management system. IBM and MQSeries are trademarks of IBM. This product supports the modeling of business processes as a network of activities. This network of activities, the process model, is constructed as a directed, acyclic, weighted, colored graph. The nodes of the graph represent the activities which are performed. The edges of the graph, the control connectors, describe the potential sequence of execution of the activities. Definition of the process graph is via IBM MQSeries Workflow's Flow Definition Language (FDL) or via the built-in graphical editor.

The runtime component of the Workflow Management System uses the process model as a template to create process instances. Each process instance is associated with a set of values, typically called the context. The values are either supplied by the requester of the process instance via the appropriate request or retrieved by programs that implement the various activities. A particular important piece of information within the context is the process instance identifier that uniquely identifies a process instance. It should be noted that typically process instance identifiers are only unique within the set of process instances that are derived from a particular process model.

The creation of a process instance is initiated by an appropriate request being made to the Workflow Management System. Many options exist for requesters to initiate the request. Typical examples include putting a message into a queue, the sending of e-mail to a particular address, the issue of an HTTP post request to a URL, or the invocation of a function of the application programming interface offered by the workflow management system. The requester could be any type of program or human interacting with the system directly; it could even be the workflow management system itself. Typically, the request has data (also part of the context) associated with it that allows the requester to immediately provide information for the process instance context.

The process instance identifier is either generated by the Workflow Management System or supplied by the requester of the process instance. Both state of the art approaches have significant disadvantages.

When the Workflow Management System generates the process instance identifier, every request to create a process instance automatically results in the creation of a process instance. Thus, if the same request is carried out twice (or in general multiple times), two process instances are created. Carrying out the same request twice could happen as the result of many different situations. One such situation involves a user interacting with the Workflow Management System via a business application accidentally starting the same request twice. For instance, clerks unconsciously repeat a certain business process for a certain set of input data multiple times not knowing or not remembering that it has been processed already.

Another such situation involves a request sent via unreliable e-mail being carried out twice. This situation can happen, for example, if the computer system on which the Workflow Management System is running and to which the e-mail was sent crashes. In this case, it can happen that the e-mail has disappeared from one of the involved systems but not from the other. Thus, it is unclear whether the e-mail was processed or not. The usual solution to this situation is to reprocess the e-mail again, with the undesirable result that the same business process processes the same input data multiple times.

The other state of the art approach, in which the requester needs to generate the process instance identifier, also has significant disadvantages. In particular, one disadvantage is if there is more than one requester creating process instances, which in general is the typical situation. In this case, requesters must not use the same process instance identifier. Thus, requesters must share some common method to obtain unique process instance identifiers. This requires, for example, that any newly added requester implements the common method. In other words, the requests have to check against one another to exploit the same approach for creating process instance identifiers. This becomes very quickly an administrative and program development nightmare.

The weakness of the state of the art approaches with respect to this problem area becomes even more distinct if one thinks of typical Internet scenarios commonly summarized by terms like C2B (Consumer-to-Business) or B2B (Business-to-Consumer) business processes. In these scenarios, it is obvious that neither can the requester generate the process instance identifier nor can it be guaranteed that a request is issued only once and only once.

The objective of the invention is to eliminate the risk of creating duplicate process instances for business processes created and managed by a Workflow Management System.

SUMMARY OF THE INVENTION

The objectives of the invention are solved by the independent claims. Further advantageous arrangements and embodiments of the invention are set forth in the respective subclaims.

The present invention relates to a method and to a system for controlling the creation of process instances within an execution environment. Upon receiving a request to create a process instance and corresponding input data to be processed by said process instance, the method and corresponding system in a first step constructs a process instance identifier for said process instance to be created based on the provided input data. In a second step the method and corresponding system is executing said create request only, if no process instance exists or existed in the past with said process instance identifier. In the case, that that particular process instance already exists or existed in the past with said process instance identifier, the present invention optionally proposes to have some user-defined action to be carried out.

The suggested approach eliminates the possibility that multiple process instances are created representing the same create request. In addition, the support of an action to be taken if a process instance with the new process instance identifier exists already, provides, for example, for the notification of appropriate service personnel to take appropriate actions.

DESCRIPTION OF THE PREFERRED EMBODIMENT

Figure 1:
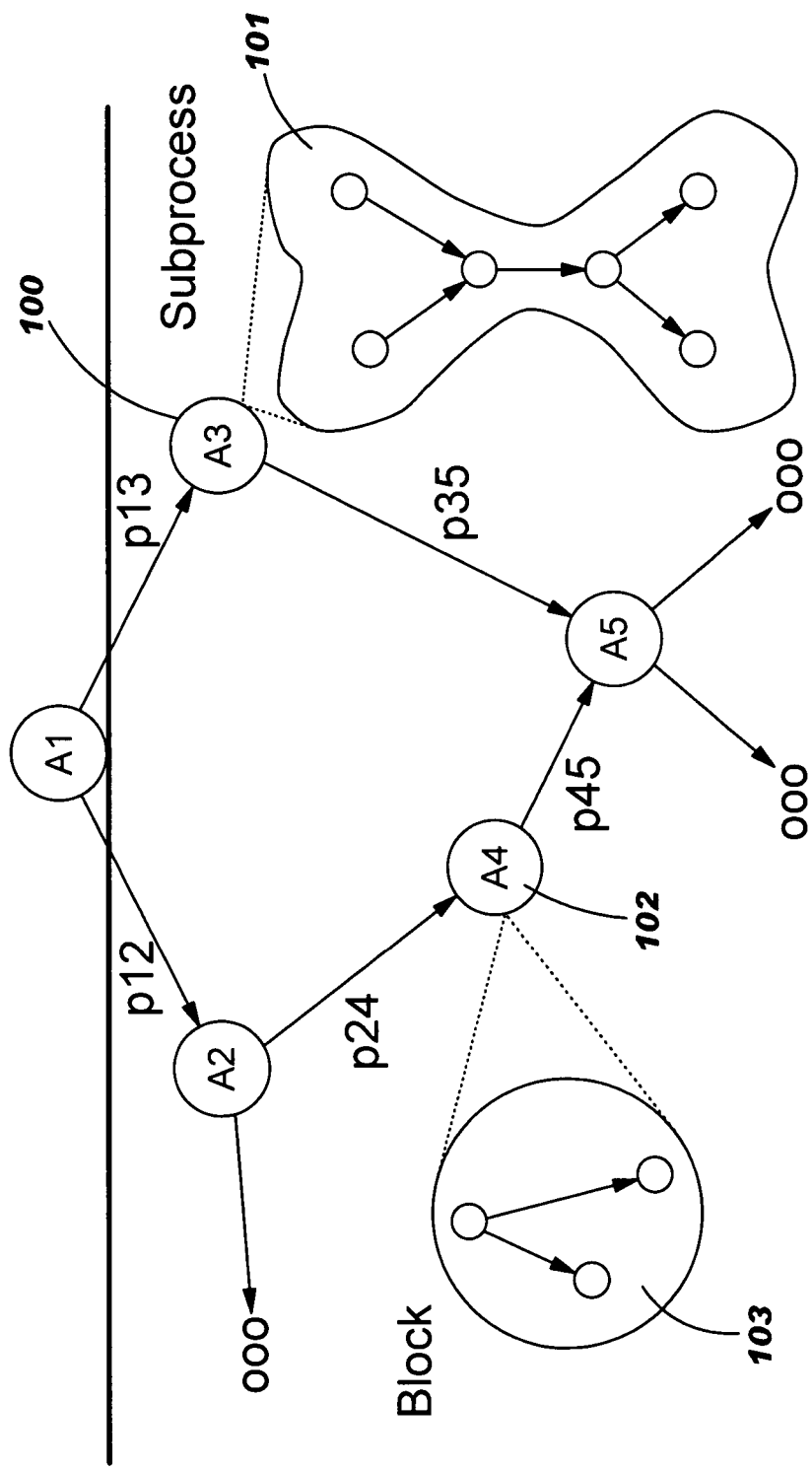
FIG. 1 shows an example of a process model represented by a process graph.

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system or other apparatus adapted for carrying out the methods described herein is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when being loaded in a computer system, is able to carry out these methods.

Computer program means or computer program in the present context mean any expression, in any language, code or notation, of a set of instructions intended to cause a system having an information processing capability to perform a particular function either directly or after either or both of (a) conversion to another language, code or notation, and/or (b) reproduction in a different material form.

The current invention is illustrated based on IBM's "MQSeries Workflow" workflow management system. Of course, any other WFMS could be used instead. Furthermore the current teaching applies also to any other type of system, which offers WFMS functionalities not as a separate WFMS but within some other type of system.

Though the created requests of the following examples are processed by the WFMS engine this should not be understood as a limitation. The current invention can be applied in other scenarios wherein the processing entity of the create command is not the WFMS engine itself.

The following is a short outline on the basic concepts of a workflow management system based on IBM's "MQSeries Workflow" WFMS.

From an enterprise point of view, the management of business processes is becoming increasingly important. Business processes, or process for short, control which piece of work will be performed by whom and which resources are exploited for this work. That is, a business process describes how an enterprise will achieve its business goals. A WFMS may support both the modeling of business processes and their execution.

Modeling of a business process as a syntactical unit in a way that is directly supported by a software system is extremely desirable. Moreover, the software system can also work as an interpreter basically getting as input such a model. The model, called a process model or workflow model, can then be instantiated and the individual sequence of work steps depending on the context of the instantiation of the model can be determined. Such a model of a business process can be perceived as a template for a class of similar processes performed within an enterprise. The model is a schema describing all possible execution variants of a particular kind of business process. An instance of such a model and its interpretation represents an individual process, i.e., a concrete, context dependent execution of a variant prescribed by the model. A WFMS facilitates the management of business processes. The WFMS provides a means to describe models of business processes (buildtime) and it drives business processes based on an associated model (runtime). The meta model of IBM's WFMS MQSeries Workflow, i.e., the syntactical elements provided for describing business process models, and the meaning and interpretation of these syntactical elements, is described next.

A process model is a complete representation of a process, comprising a process diagram and the settings that define the logic behind the components of the diagram. Important components of a MQSeries Workflow process model are: Processes; Activities; Blocks; Control Flows; Connectors; Data Containers; Data Structures; Conditions; Programs; and Staff.

Not all of these elements will be described below.

Activities are the fundamental elements of the meta model. An activity represents a business action that is from a certain perspective a semantic entity of its own.

An MQSeries Workflow process model consists of a number of types of activities. A program activity has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities. A process activity has a process or subprocess assigned to perform it. The process is invoked when the activity is started. A process activity represents a way to reuse a set of activities that is common to different processes. Output from the process can be used in the exit condition for the process activity and for the transition conditions to other activities.

The flow of control, i.e., the control flow through a running process, determines the sequence in which activities are executed. The MQSeries Workflow workflow manager navigates a path through the process that is determined by the evaluation to TRUE of start conditions, exit conditions, and transition conditions.

Connectors link activities in a process model. Using connectors, one defines the sequence of activities and the transmission of data between activities. Since activities might not be executed arbitrarily they are bound together via control connectors. A control connector might be perceived as a directed edge between two activities. The activity at the connector's end point cannot start before the activity at the start point of the connector has finished (successfully). Thus, control connectors model the potential flow of control within a business process model. Default connectors specify where control should flow when the transition condition of no other control connector leaving an activity evaluates to TRUE. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Process definition includes modeling of activities, control connectors between the activities, input/output container, and data connectors. A process is represented as a directed acyclic graph with the activities as nodes and the control/data connectors as the edges of the graph. The graph is manipulated via a built-in graphic editor. The data containers are specified as named data structures. These data structures themselves are specified via the Data Structure Definition facility. Program activities are implemented through programs. The programs are registered via the Program Definition facility. Blocks contain the same constructs as processes, such as activities, control connectors etc. They are however not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows to construct a process through permanent refinement of activities into program and process activities (top-down), but also to build a process out of a set of existing processes (bottom-up).

All programs, which implement program activities, are defined via the Program Registration Facility. Registered for each program is the name of the program, its location, and the invocation string. The invocation string consists of the program name and the command string passed to the program.

As an example of such a process model, FIG. 1 shows schematically the structure of such a process graph. Activities (A1 up to A5) are represented as named circles. The name typically describes the purpose of the activity. Activities come in various flavors to address the different tasks that may need to be performed. They may have different activity implementations to meet these diverse needs. Program activities are performed by an assigned program, process activities like for instance 100 are performed by another process 101, and blocks like for instance 102 implement a macro 103 with a built-in do-until loop.

Control connectors p12, p13, p24, p35, p45 are represented as arrows. The head of the arrow describes the direction in which the flow of control is moving through the process. The activity where the control connector starts is called the source activity; where it ends is called the target activity. When more than one control connector leaves an activity, this indicates potentially parallel work.

Process States

Figure 2:
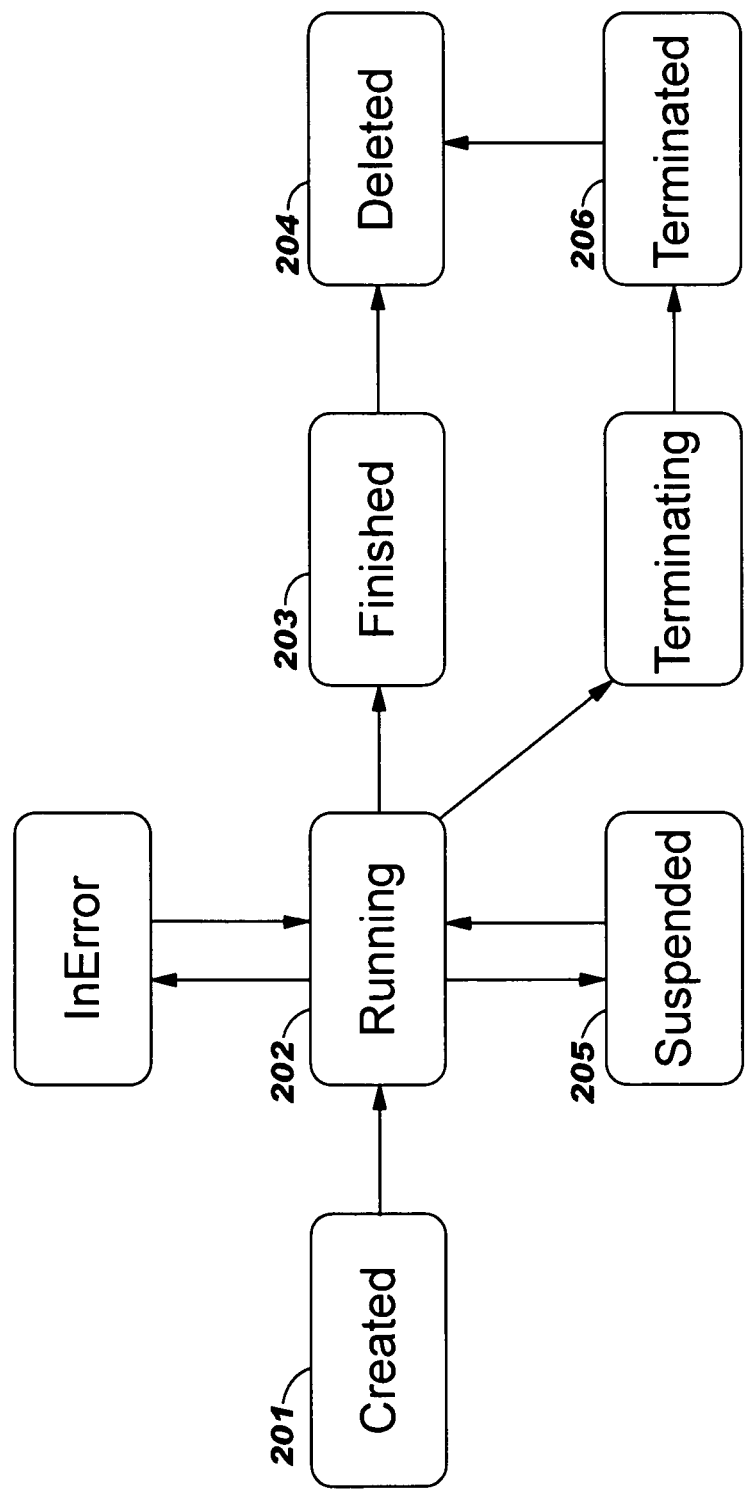
FIG. 2 illustrates on an exemplary level the states a process instance can take when it is carried out by the Workflow Management System.

A process instance occupies various states when it is carried out by the Workflow Management System. FIG. 2 illustrates those states exemplary. It should be noted that this for illustration purpose only, as Workflow Management Systems typically differentiate between many more states.

The first step a particular process instance goes through is that it is created by taking the appropriate process template (process model), possibly populating it with supplied context data, and assigning it a unique process instance identifier. This step is carried out as the result of invoking the Workflow Management System's CREATE function. As a result of function completion, the process instance is put into the state created 201.

When the process instance is being carried out, that means the Workflow Management System navigates through the process graph and executes the individual activities. The process is in the state running 202. The business process is typically put into this state by a client issuing a START control command. Other possibilities are that the business process is automatically started by the Workflow Management System at a time specified when the business process is created, or a combination of a CREATE and START control command.

When all necessary activities of the process instance have been carried out, the process goes into the state finished 203. No further activities are carried out for the process instance. However, all information about the process instance is still available and can, for example, be queried. Some Workflow Management Systems still allow operations on finished process instances, such as restarting the process instance at the beginning or even in the middle of the process instance.

No further actions can be carried out if the process instance is in the state deleted 204.

The state suspended 205 is entered as the result of entering the SUSPEND function by issuing a corresponding control command. In this state, the Workflow Management System stops navigation until a user via the RESUME control command requests continuation.

A process instance enters the state terminated 206 as the result of the TERMINATE control command, which causes the Workflow Management System to stop processing the process instance.

Controlling the Creation of Process Instances

Figure 3:
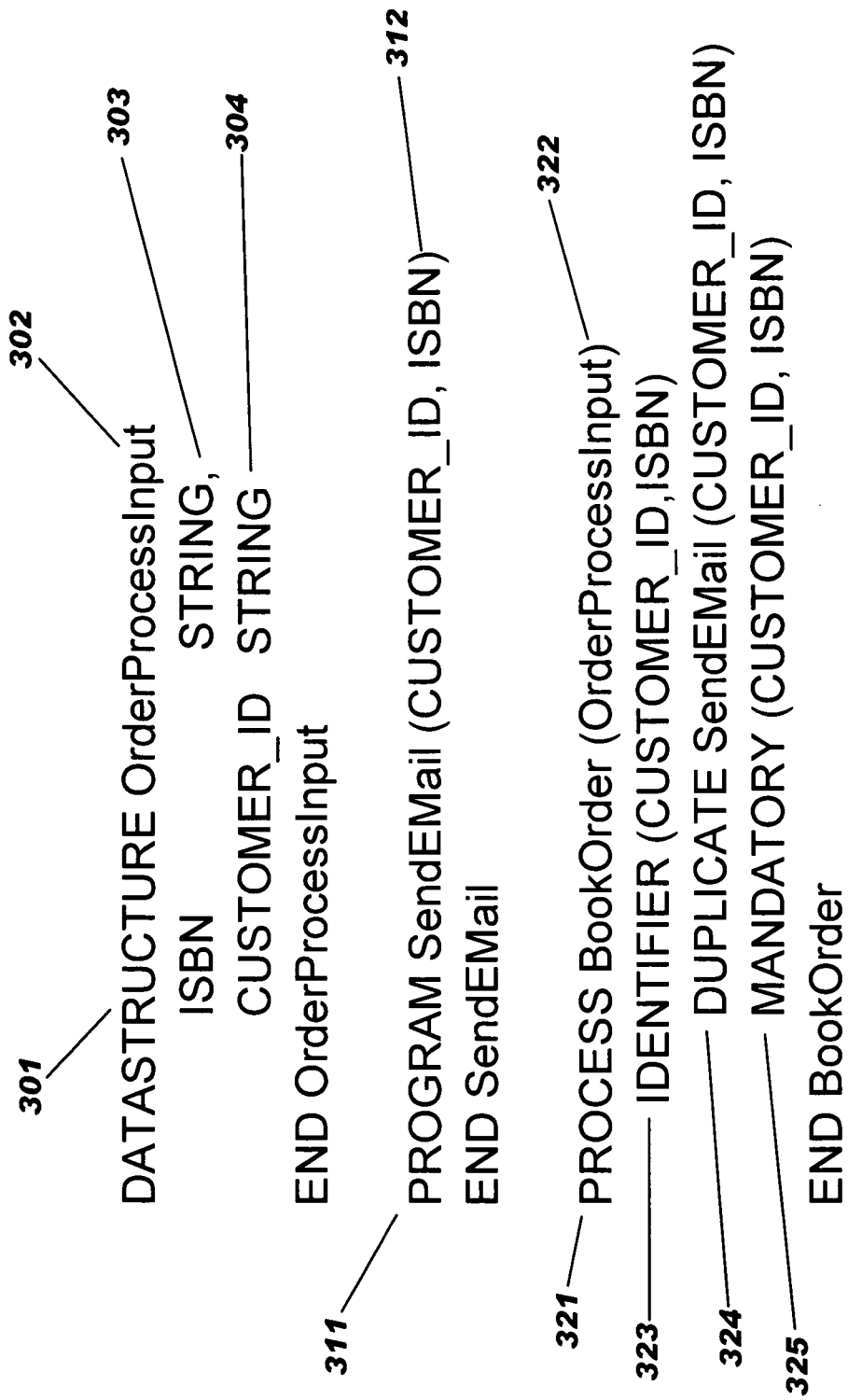
FIG. 3 visualizes the details of the specification mechanism for process instance identifiers using the Flow Definition Language of MQSeries Workflow, which form the basis of controlling the generation of process instances according to the current invention.

FIG. 3 illustrates how the present invention can be implemented using the Flow Definition Language (FDL) of MQSeries Workflow, a state of the art Workflow Management System sold by the IBM. FDL is used as an example only and any other way of specifying the control of process instance creation can be employed. The underlying meta model is also for illustration only; other meta models can be used instead.

The DATASTRUCTURE definition 301 identifies a data structure with the name OrderProcessInput 302 that consists of two members, a first member ISBN of data type STRING 303 and a second member CUSTOMER_ID of data type STRING 104. This data structure defines the input parameters (that is, the input container) of the business process as apparent from the interface definition 322 of the process BookOrder 321.

The PROGRAM definition 311 declares a program with the name SendEMail 312 which accepts the two fields CUSTOMER_ID and ISBN. For simplification, no further definitions, such as the actual implementation of the program, is provided.

The PROCESS definition 321 defines a process model with the name BookOrder, which accepts the previously defined data structure OrderProcessInput 322. That means, when a process instance is created via the appropriate request, the requester can (in fact should) specify concrete values for the fields in the data structure. These include a value for the field ISBN and a value for the field CUSTOMER_ID. The IDENTIFIER keyword 323 is used to specify how the process instance identifier is to be constructed. In this case, it is constructed by combining the values of the fields CUSTOMER_ID and ISBN.

In the specific example of FIG. 3, all parameters of the input container 302 are used to create the process instance identifier. In a certain sense, this is an extreme example as the IDENTIFIER specification supports the use any subset of the parameters within the input container for constructing the process instance identifier. It would even be possible to include in the IDENTIFIER specification parameters, which are not comprised by the input container, their corresponding values being provided from other sources.

Finally, the process instance identifier can be viewed as a concatenation of the concrete values of the parameters specified within the IDENTIFIER section of the process model's FDL. In a further embodiment of the current invention the name of the process (BookOrder in the current example) could automatically and implicitly be made part of the process instance identifier. This guarantees uniqueness of the process instance identifier not only within the set of process instances derived from a particular process model but within all process instances independently from the particular process model.

The keyword MANDATORY 325 is used to indicate that the requester must supply values for the specified fields. This is necessary to make sure that the Workflow Management System does not generate a process instance identifier which is meaningless, such as an empty process instance identifier. In other words, the parameters comprised within the MANDATORY specification defines the "Minimum" components whose values making up the process instance identifier.

At runtime, the specifications regarding the construction of the process instance identifier are used by the WFMS in the following manner.

First, it is checked whether concrete values have been specified by a requester for the parameters as specified in the MANDATORY section 325 of the process model's FDL. Without concrete values for all of the mandatory parameters, no unique process instance can be created and therefore the corresponding request for creating a process instance will be rejected.

If values for the mandatory parameters have been specified with the process instance creation request, a process instance identifier is constructed according to the definition specification in the IDENTIFIER section 323 (optionally comprising the process name as part of the process instance identifier). The WFMS will then check whether a process instance with that process instance identifier exists already (or has existed and was executed in the past). A new process instance for that process model will be created by the WFMS only if that has not been the case according to that check, thus establishing a "once and only once" execution scheme.

If a process instance with this process instance identifier exists already, the action specified via the DUPLICATE keyword 304 is being carried out. In this case, the action is invocation of the program SendEMail with the two fields as parameters. Thus based on the DUPLICATE keyword a kind of error handling is established. In the example illustrated in FIG. 3, the error handling consists of an e-mail notification regarding the duplicate creation request for the identical business process.

In a further embodiment of the current invention, those specifications comprised by the IDENTIFIER keyword, the DUPLICATE keyword or the MANDATORY keyword may also be specified with the request to create a certain process instance in addition to the actual input data to be processed by the process instance. Such an approach allows for a highly dynamically manner of creating process instance identifiers and controlling the creation of process instances.

The invention claimed is:

1. A method of providing process instance creation control within an execution environment, said method comprising the steps of:
   receiving a request to create a process instance at a computer system hardware;
   constructing a process instance identifier with a computer system hardware that uniquely identifies a process instance to be created based on input data provided with said request, wherein the input data is to be processed by the process instance;
   creating the process instance with a computer system hardware, the process instance having said process instance identifier within the execution environment if no process instance exists or existed with an identical process instance identifier;
   and wherein the process instance is created from a process model, and wherein the process model comprises a first specification defining a subset of input parameters of the process model, and values of the subset of the input parameters are to be used for constructing said process instance identifier, and wherein said constructing step further comprises creating said process instance identifier using the subset of the input parameters.

2. A method of providing process instance creation control within an execution environment according to claim 1, wherein the process model further comprises a second specification which defines a mandatory subset of input parameters of the process model for which values must be specified with said request, and wherein said creating step does not create a process instance if any value of the mandatory subset of input parameters is not supplied with said request.

3. A method of providing process instance creation control within an execution environment according to claim 2,
   wherein the process model further comprises a third specification which defines an action to be executed if another process instance with the identical process instance identifier exists or existed; and
   wherein said creating step further comprises, if another process instance identifier with the identical process instance identifier exists or existed, executing the action.

4. A method of providing process instance creation control within an execution environment according to claim 3, wherein at least one of said first specification, said second specification and said third specification is provided with said request.

5. A method of providing process instance creation control within an execution environment according to claim 1, wherein the execution environment is a Workflow Management System, and wherein said method is executed by the Workflow Management System itself.

6. A method of providing process instance creation control within an execution environment according to claim 5, wherein said request to create a process instance is carried out by the Workflow Management System itself.

7. A system in a computing environment for providing process instance creation control within an execution environment, said system comprising:
   computer system means for receiving a request to create a process instance at a computer system hardware;
   computer system means for constructing a process instance identifier with a computer system hardware that uniquely identifies a process instance to be created based on input data provided with said request, the input data to be processed by the process instance;

computer system means for determining with a computer system hardware if said process instance identifier has already been used with a different process instance;

computer system means for creating with a computer system hardware the process instance having said process instance identifier within said execution environment if it is determined that said process instance identifier has not already been employed with a different process instance; wherein the process instance is created from a process model, and wherein the process model comprises a first specification defining a subset of input parameters of the process model, and values of the subset of the input parameters are to be used for constructing said process instance identifier, and wherein said constructing means further comprises creating said process instance identifier using the subset of the input parameters.

8. A system for providing process instance creation control within an execution environment according to claim 7, wherein the process model further comprises a second specification which defines a mandatory subset of input parameters of the process model for which values must be specified with said request, and wherein said creating means does not create a process instance if any value of the mandatory subset of input parameters is not supplied with said request.

9. A system for providing process instance creation control within an execution environment according to claim 8, wherein the process model further comprises a third specification which defines an action to be executed if said determining means determines that a different process instance has already used said process instance identifier; and wherein said creating means further comprises, if it is determined that a different process instance has already used said process instance identifier, executing the action.

10. A system for providing process instance creation control within an execution environment according to claim 9, wherein at least one of said first specification, said second specification and said third specification is provided with said request.

11. A system for providing process instance creation control within an execution environment, the system comprising:

one or more computer systems having hardware and instructions to perform:

first subprocess for receiving a request to create a process instance with the computer system hardware;

second subprocesses for constructing a process instance identifier with the computer system hardware that uniquely identifies a process instance to be created based on input data provided with said request, the input data to be processed by the process instance;

third subprocesses for creating the process instance with the computer system hardware having said process instance identifier within the execution environment if no process instance exists or existed having the identical process instance identifier;

wherein the process instance is created from a process model, and wherein the process model comprises a first specification defining a subset of input parameters of the process model, and values of the subset of the input parameters are to be used for constructing said process instance identifier, and wherein said second subprocesses further comprises creating said process instance identifier using the subset of the input parameters.

12. The system according to claim 11, wherein the process model further comprises a second specification which defines a mandatory subset of input parameters of the process model for which values must be specified with said request, and wherein said third subprocesses does not create a process instance if any value of the mandatory subset of input parameters is not supplied with said request.

13. The system according to claim 12, wherein the process model further comprises a third specification which defines an action to be executed if another process instance with the identical process instance identifier exists or existed; and wherein said third subprocesses further comprises, if another process instance with the identical process instance identifier exists or existed, executing the action.

14. The system according to claim 13, wherein at least one of said first specification, said second specification and said third specification is provided with said request.

* * * * *